United States Patent
Pan et al.

(10) Patent No.: US 8,391,035 B2
(45) Date of Patent: Mar. 5, 2013

(54) INTEGRATED-TYPE HIGH STEP-UP RATIO DC-AC CONVERSION CIRCUIT WITH AUXILIARY STEP-UP CIRCUIT

(75) Inventors: Ching-Tsai Pan, Hsinchu (TW); Ching-Ming Lai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 382 days.

(21) Appl. No.: 12/898,048

(22) Filed: Oct. 5, 2010

(65) Prior Publication Data

US 2011/0205762 A1 Aug. 25, 2011

(30) Foreign Application Priority Data

Feb. 24, 2010 (TW) ................. 99105289 A

(51) Int. Cl.
 *H02M 3/335* (2006.01)
(52) U.S. Cl. .......................................... 363/65
(58) Field of Classification Search ............ 363/16, 363/37, 65, 71
See application file for complete search history.

(56) References Cited

U.S. PATENT DOCUMENTS

| | | | | | |
|---|---|---|---|---|---|
| 4,661,897 | A | * | 4/1987 | Pitel | 363/71 |
| 4,763,237 | A | * | 8/1988 | Wieczorek | 363/20 |
| 4,814,965 | A | * | 3/1989 | Petersen | 363/65 |
| 5,008,795 | A | * | 4/1991 | Parsley et al. | 363/20 |
| 5,272,612 | A | * | 12/1993 | Harada et al. | 363/8 |
| 5,508,903 | A | * | 4/1996 | Alexndrov | 363/16 |
| 5,566,060 | A | * | 10/1996 | Shimer et al. | 363/65 |
| 5,576,940 | A | * | 11/1996 | Steigerwald et al. | 363/17 |
| 5,682,303 | A | * | 10/1997 | Goad | 363/71 |
| 5,691,631 | A | * | 11/1997 | Shimamori et al. | 323/272 |
| 5,781,421 | A | * | 7/1998 | Steigerwald et al. | 363/21.08 |
| 6,055,169 | A | * | 4/2000 | Bowman et al. | 363/65 |
| 6,574,124 | B2 | * | 6/2003 | Lin et al. | 363/65 |
| 7,030,512 | B2 | * | 4/2006 | Krein | 307/77 |
| 7,394,671 | B2 | | 7/2008 | Fukumoto et al. | |
| 7,518,886 | B1 | * | 4/2009 | Lai et al. | 363/17 |
| 7,551,463 | B2 | | 6/2009 | Ros et al. | |
| 7,613,020 | B2 | * | 11/2009 | Nukisato et al. | 363/67 |
| 7,626,834 | B2 | | 12/2009 | Chisenga et al. | |
| 7,830,686 | B2 | * | 11/2010 | Zeng et al. | 363/69 |
| 8,031,495 | B2 | * | 10/2011 | Sachdeva et al. | 363/71 |
| 8,310,102 | B2 | * | 11/2012 | Raju | 307/82 |
| 2011/0205762 | A1 | * | 8/2011 | Pan et al. | 363/21.04 |

* cited by examiner

*Primary Examiner* — Jeffrey Sterrett

(74) *Attorney, Agent, or Firm* — Muncy, Geissler, Olds & Lowe, PLLC

(57) ABSTRACT

An integrated-type high step-up ratio DC-AC conversion circuit with an auxiliary step-up circuit applies to converting a low DC voltage of alternative energy into a high AC voltage. The conversion circuit uses an isolated Cuk integration unit and an auxiliary step-up unit to form a multi-phase input and uses parallel charging and cascade discharging to boost the DC voltage in the DC side with a low voltage power switches and low duty cycle and then converts the boosted DC voltage into AC voltage. The auxiliary step-up unit not only shares the entirety of power but also exempts the DC-side circuit from using high voltage power switches, whereby the cost of elements is reduced. Further, the conversion circuit can decrease the switching loss and conduction loss of the DC-side switches and promote the efficiency of the circuit.

7 Claims, 13 Drawing Sheets

US 8,391,035 B2

INTEGRATED-TYPE HIGH STEP-UP RATIO DC-AC CONVERSION CIRCUIT WITH AUXILIARY STEP-UP CIRCUIT

FIELD OF THE INVENTION

The present invention relates to a DC-AC conversion circuit, particularly to an integrated-type high step-up ratio DC-AC conversion circuit with an auxiliary step-up circuit.

BACKGROUND OF THE INVENTION

Mass utilization of petroleum has generated enormous pollution and obviously changed the global ecological environment. It is also the primary factor causing climate change and global warming. Facing severe pollution caused by petroleum, many nations and large businesses have paid attention to develop alternative energy, such as solar energy. As to solar energy, the energy of sunlight is converted into DC current or DC voltage via photoelectric conversion. DC voltage must be converted into high-voltage AC voltage before it can apply to common household appliances.

Refer to FIG. 1. A conventional DC-AC conversion circuit used in alternative energy system comprises a low-voltage energy input unit 1, a step-up converter 2, a DC-AC converter 3 and an output load 4. The low-voltage energy input unit 1 is a power source, such as a solar panel or fuel cell. The step-up converter 2 transforms the received DC voltage into a high DC voltage via amplification. The DC-AC converter 3 transforms the high DC voltage into an AC voltage. Then, the output load 4 outputs the high AC voltage. However, the above-mentioned two stages of voltage conversions greatly lower the reliability and efficiency. Referring to FIG. 2 for another conventional DC-AC conversion circuit, where the above-mentioned step-up converter 2 and DC-AC converter 3 are integrated into an integrated converter 5, whereby is reduced the complexity and area of the hardware circuit, wherefore is decreased the cost of the overall system. However, the amplification of the step-up converter 2 is still insufficient. Thus, the DC-AC conversion circuit can only apply to the cases having a higher-voltage DC power source.

U.S. Pat. No. 7,394,671 disclosed a DC-AC converter, which uses a chip to control the turn-on timings of two semiconductor switches to obtain a stable AC output. U.S. Pat. No. 7,626,834 disclosed a DC-AC converter, which comprises four power source switches, two diodes, insulation transformers, capacitors and etc., wherein charge and discharge of the capacitors are realized by the power source switches, and the electricity is transferred to the rear end and converted into AC output. In the above prior arts, the DC switches (the semiconductor switches or power source switches) have to resist higher DC voltage. If the switch does not have sufficient voltage resistance or current resistance, it may be damaged. As the DC switches have to resist higher voltage, they usually have higher price, larger volume, greater switching loss and insufficient step-up ratios.

U.S. Pat. No. 7,551,463 disclosed a current-limiting circuit to protect power source switches lest high voltage or high current damage the power source switches. The current-limiting circuit can effectively prevent DC switches from being damaged. However, the step-up ratio and conversion efficiency are still insufficient. Further, the current-limiting circuit occupies additional area. Therefore, the conventional DC-AC conversion circuits still have room to improve.

SUMMARY OF THE INVENTION

The primary objective of the present invention is to solve the problem that the conventional DC switches have to sustain high voltage and thus have higher cost and greater volume.

Another objective of the present invention is to solve the problem that the conventional DC switches have great switching loss and insufficient step-up ratios.

To achieve the above-mentioned objectives, the present invention provides an integrated-type high step-up ratio DC-AC conversion circuit with an auxiliary step-up circuit, which comprises a DC input unit providing a DC voltage; an isolated Cuk integration unit; an auxiliary step-up unit; and an AC output unit.

The isolated Cuk integration unit converts the DC voltage into a high DC voltage. The isolated Cuk integration unit comprises a first converter connected with the DC input unit and a first capacitor connected with the first converter. The first capacitor stores power coming from the first high-frequency transformer. The auxiliary step-up unit is connected with the isolated Cuk integration unit in parallel. The auxiliary step-up unit comprises a second converter connected with the DC input unit and a second capacitor connected with the second converter and the first capacitor. The second capacitor stores power coming from the second converter. The AC output unit is connected with the first capacitor and the second capacitor and converts the high DC voltage into the AC voltage.

In the present invention, the isolated Cuk integration unit and the auxiliary step-up unit are connected to the DC input unit in parallel. The isolated Cuk integration unit and the auxiliary step-up unit convert voltage of the DC input unit by the first and second converters and store the voltage in the first and second capacitors respectively. In other words, the isolated Cuk integration unit and the auxiliary step-up unit perform parallel charging. Then, the first and second capacitors perform cascade discharging to boost the DC voltage. The boosted DC voltage is sent to the AC output unit and converted into AC voltage.

The present invention uses the isolated Cuk integration unit and the auxiliary step-up unit to form a multi-phase input and uses parallel charging and cascade discharging to boost the DC voltage in the DC side with low voltage rating switches and low duty cycle. The auxiliary step-up unit not only shares the entirety of power but also exempts the DC-side circuit from using high voltage power switch, whereby the cost of elements is reduced. Therefore, the present invention can decrease the switching loss and conduction loss of the DC-side switches and promote the efficiency of the overall circuit.

DETAILED DESCRIPTION OF THE PREFERRED EMBODIMENTS

The technical contents of the present invention are described in detail in cooperation with the drawings below.

Figure 1:
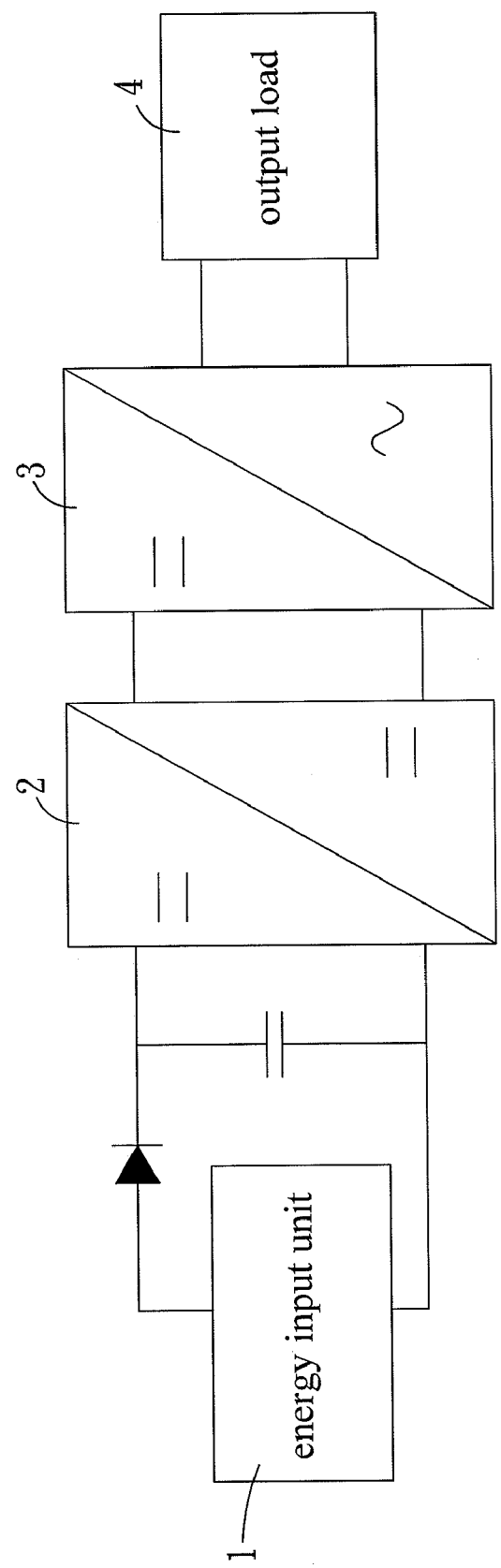
FIG. 1 is a schematic view showing a conventional two-phase converter system.
Figure 2:
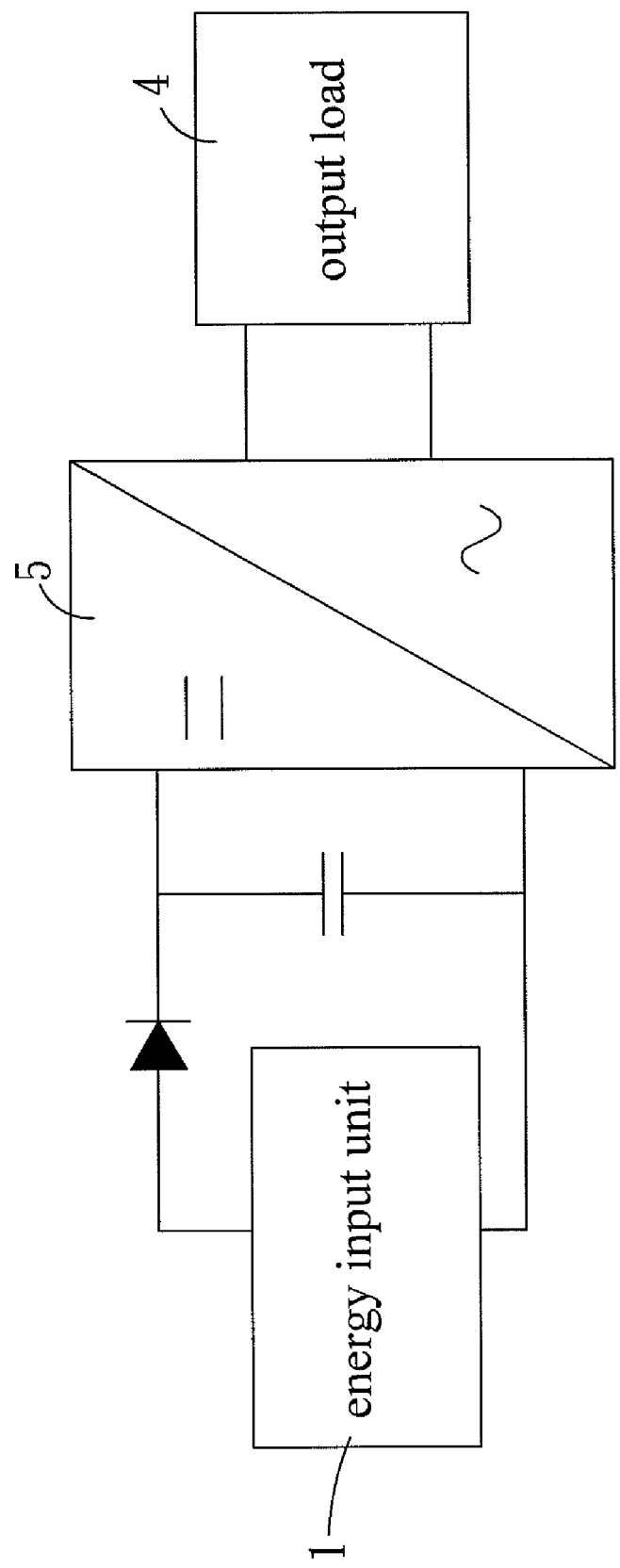
FIG. 2 is a schematic view showing a conventional integrated-type converter system.
Figure 3:
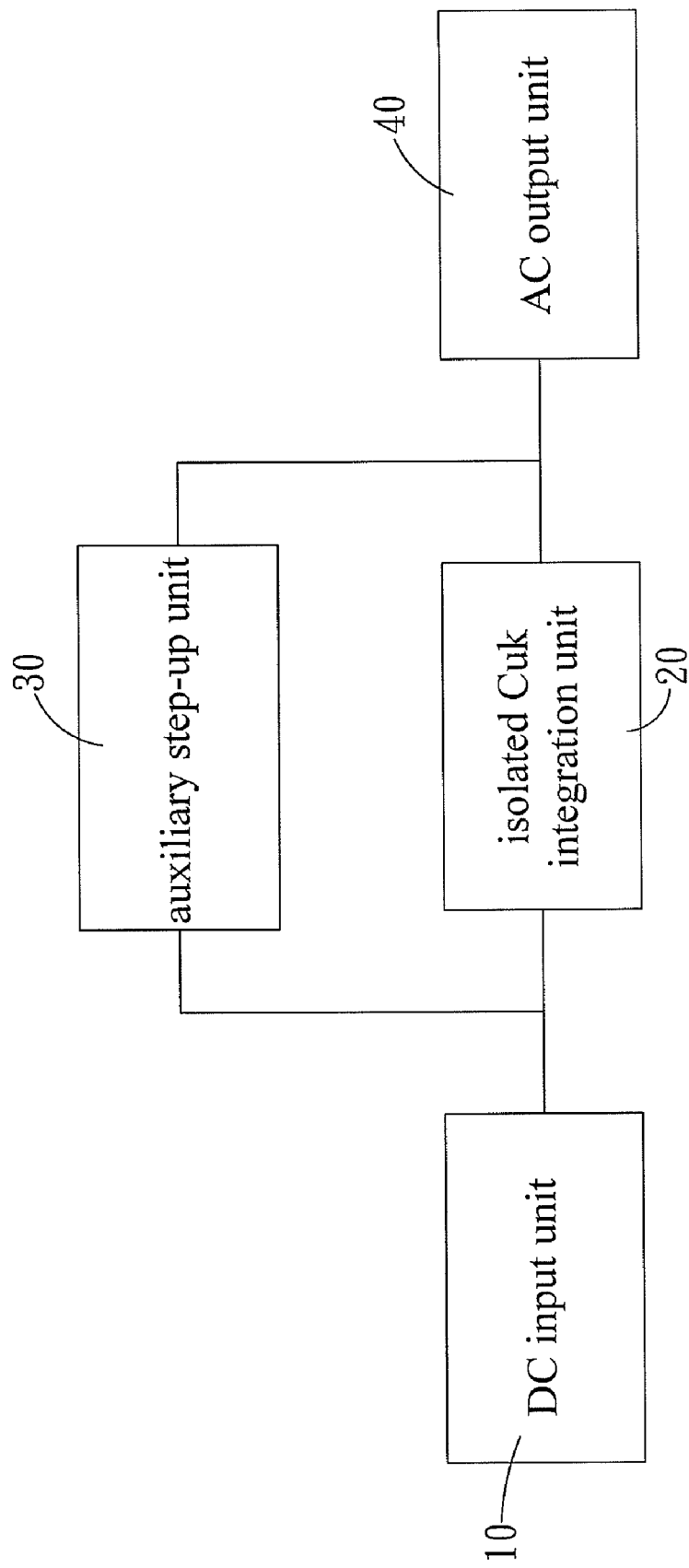
FIG. 3 is a block diagram schematically showing the circuit architecture according to one embodiment of the present invention.
Figure 4:
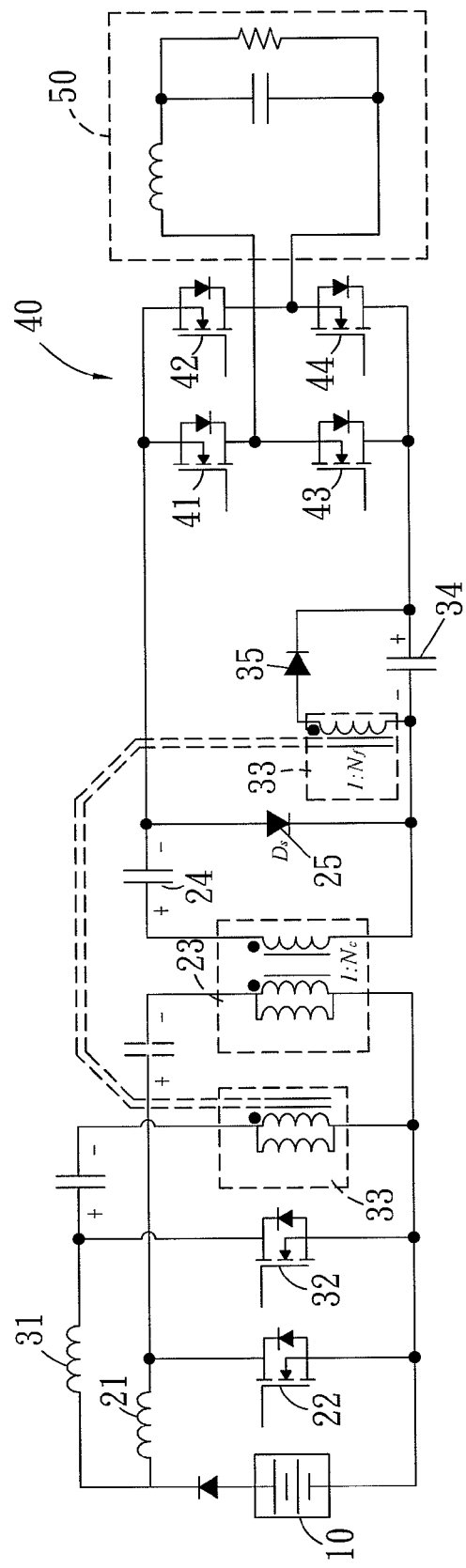
FIG. 4 is a schematic view showing a circuitry according to one embodiment of the present invention.

Refer to FIG. 3 and FIG. 4. FIG. 3 is a block diagram schematically showing the circuit architecture according to one embodiment of the present invention. FIG. 4 is a schematic view showing a circuitry according to one embodiment of the present invention. The present invention provides an integrated-type high step-up ratio DC-AC conversion circuit with an auxiliary step-up circuit, which comprises a DC input unit 10 providing a DC voltage; an isolated Cuk integration unit 20; an auxiliary step-up unit 30; and an AC output unit 40.

The isolated Cuk integration unit 20 converts the DC voltage into a high DC voltage. The isolated Cuk integration unit 20 further comprises a first inductor 21, a first DC-side switch 22, a first high-frequency transformer 23, a first capacitor 24 and a first diode 25. The first inductor 21 is connected to the DC input unit 10. The first inductor 21 also connects with the first DC-side switch 22 and the first high-frequency transformer 23 so that the first high-frequency transformer 23 and the first DC-side switch 22 are connected in parallel. The first capacitor 24 connects with the first high-frequency transformer 23 and the first diode 25 to form a loop.

The auxiliary step-up unit 30 and the isolated Cuk integration unit 20 are connected in parallel. The auxiliary step-up unit 30 further comprises a second inductor 31, a second DC-side switch 32, a second high-frequency transformer 33, a second capacitor 34 and a second diode 35. The second inductor 31 is connected to the DC input unit 10. The second inductor 31 also connects with the second DC-side switch 32 and the second high-frequency transformer 33 so that the second high-frequency transformer 33 and the second DC-side switch 32 are connected in parallel. The second capacitor 34 connects with the second high-frequency transformer 33 and the second diode 35 to form a loop. In this embodiment, both the first DC-side switch 22 and the second DC-side switch 32 are transistor switches.

The AC output unit 40 connects with the first capacitor 24 and the second capacitor 34 to form a loop and converts the high DC voltage into an AC voltage. In this embodiment, the AC output unit 40 is a full-bridge switching circuit including four bridge-type switches: a first bridge-type switch 41, a second bridge-type switch 42, a third bridge-type switch 43 and a fourth bridge-type switch 44. The four bridge-type switches 41, 42, 43, 44 are all transistor switches. The AC output unit 40 also connects with a filter unit 50. The filter unit 50 is used to receive the AC voltage and the filter unit 50 filters out the noise of the AC voltage and stabilizes the AC voltage.

Thus, the auxiliary step-up unit 30 and the isolated Cuk integration unit 20 are connected to the DC input unit 10 in parallel. The isolated Cuk integration unit 20 and the auxiliary step-up unit 30 respectively convert voltage of the DC input unit 10 by the first and second high-frequency transformers 23 and 33 and store the voltage in the first and second capacitors 24 and 34 respectively. It is the so-called parallel charging. Then, the first and second capacitors 24 and 34 perform cascade discharging to boost the DC voltage. The boosted DC voltage is sent to the next AC output unit 40 and converted into the AC voltage.

Figure 5:
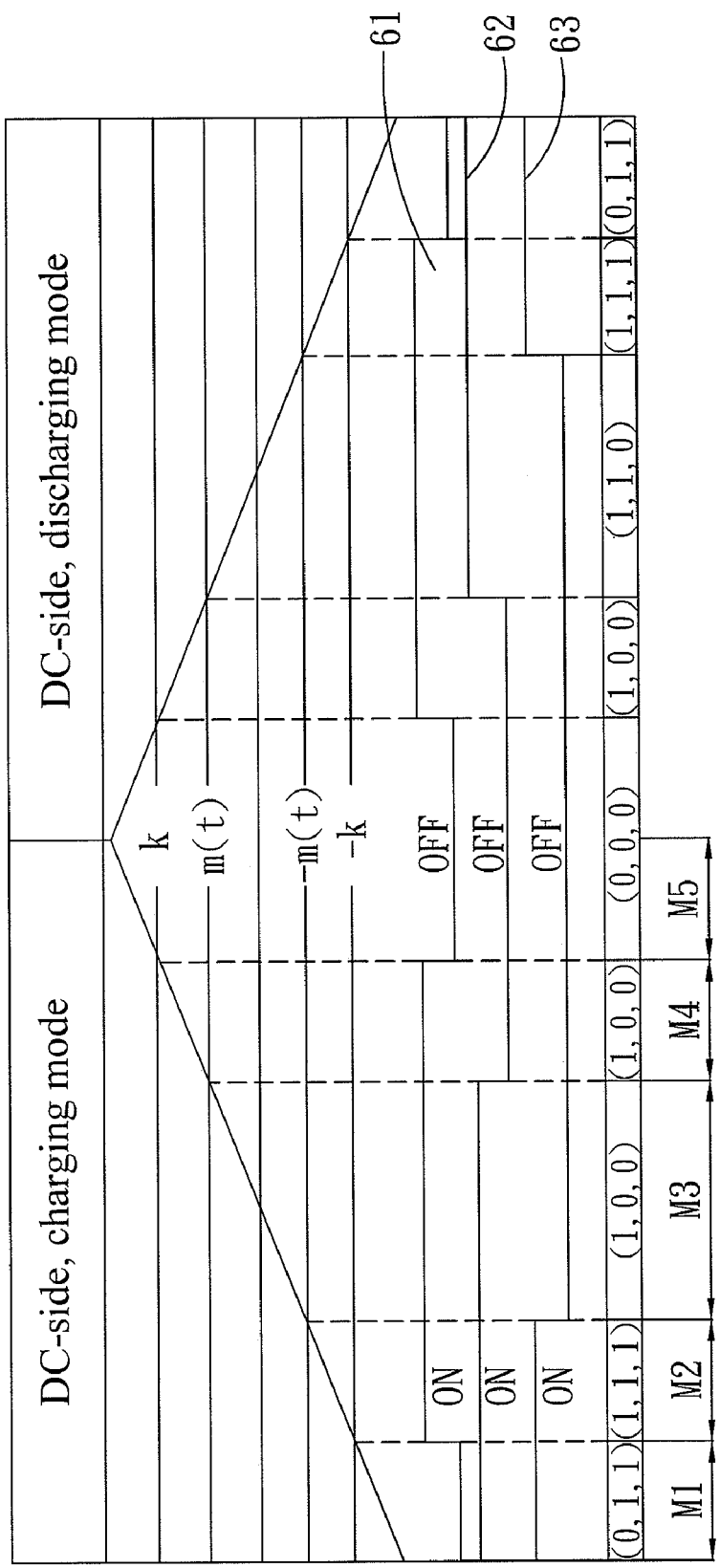
FIG. 5 is a diagram showing the timing simulation according to one embodiment of the present invention.

Below, the present invention will be further described in cooperation with FIG. 5 and FIGS. 6A-6E. FIG. 5 is a diagram schematically showing the timing simulation according to one embodiment of the present invention. FIG. 5 shows the clock 61 of the first and second DC-side switches 22 and 32, the clock 62 of the first bridge-type switch 41 and the clock 63 of the second bridge-type switch 42. FIGS. 6A-6E are schematic views showing the operation modes of a conversion circuit according to one embodiment of the present invention. Five modes shown in FIGS. 6A-6E are used to explain the operation of the conversion circuit of the present invention.

Figure 6A:
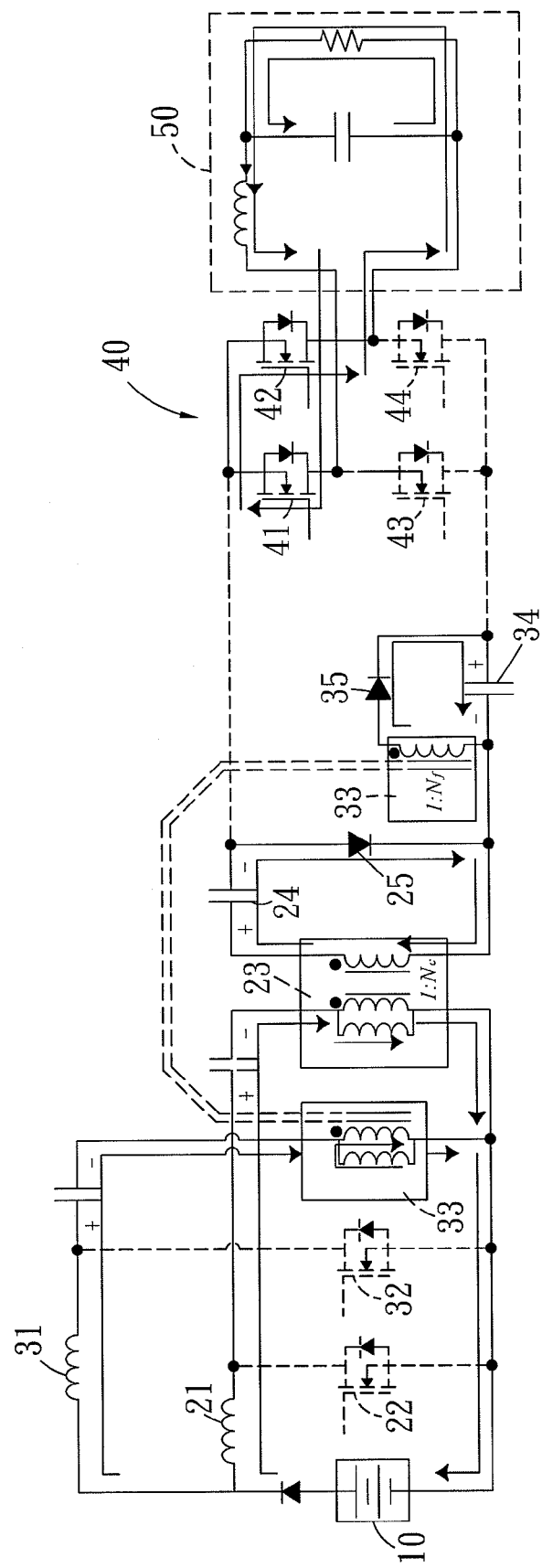
FIG. 6A is a schematic view showing Mode M1 of a conversion circuit according to one embodiment of the present invention.

Refer to FIG. 6A for Mode M1. In Mode M1, the first DC-side switch 22, the second DC-side switch 32, the third bridge-type switch 43 and the fourth bridge-type switch 44 are all in a non-conduction state. The first bridge-type switch 41 and the second bridge-type switch 42 are in a conduction state. The first and second diodes 25 and 35 are forward biased. The first and second high-frequency transformers 23 and 33 respectively have different turns of windings. The first and second high-frequency transformers 23 and 33 respectively convert the DC voltages originally stored in the first and second inductors 21 and 31 into the high DC voltages and respectively store the high DC voltages into the first and second capacitors 24 and 34. At this time, the first bridge-type switch 41, the second bridge-type switch 42 and the filter unit 50 form a conduction loop and enter a free-wheeling operation mode.

Figure 6B:
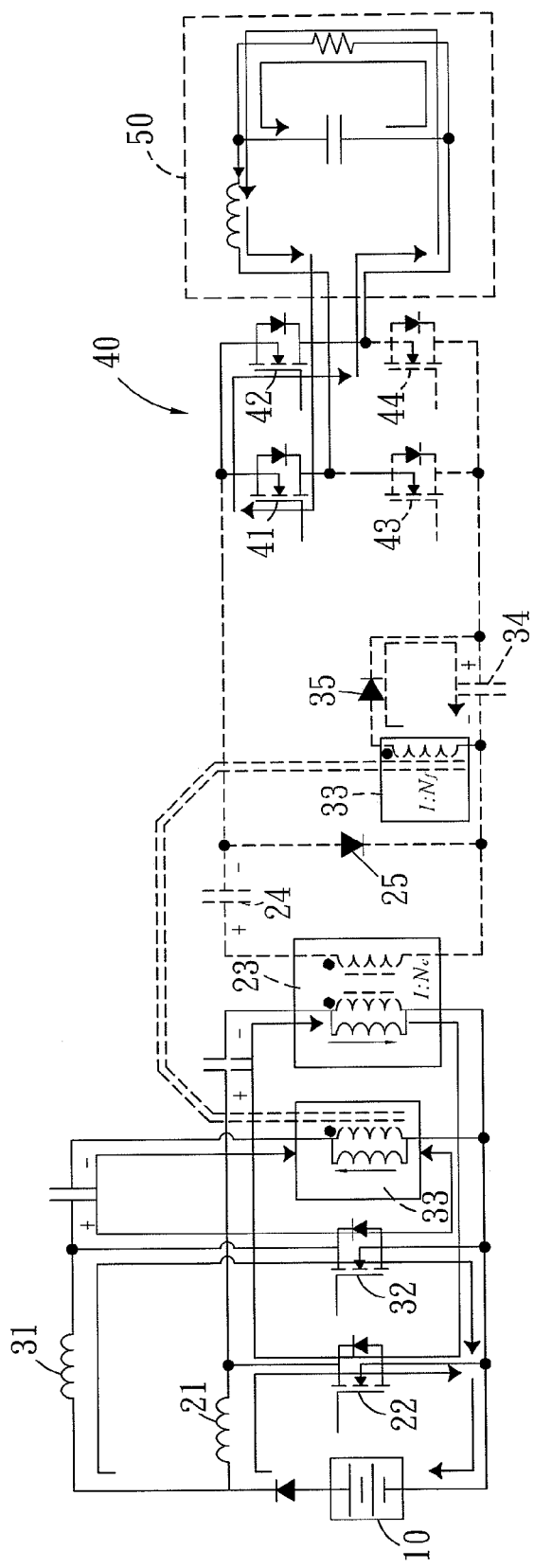
FIG. 6B is a schematic view showing Mode M2 of a conversion circuit according to one embodiment of the present invention.

Refer to FIG. 6B for Mode M2. In Mode M2, the first DC-side switch 22, the second DC-side switch 32, the first bridge-type switch 41 and the second bridge-type switch 42 are all in a conduction state. The third bridge-type switch 43 and the fourth bridge-type switch 44 are in a non-conduction state. The first and second diodes 25 and 35 are reversely biased and in a non-conduction state. In Mode M2, the DC input unit 10 charges the first and second inductors 21 and 31. Meanwhile, the first bridge-type switch 41, the second bridge-type switch 42 and the filter unit 50 remain in the free-wheeling operation mode.

Figure 6C:
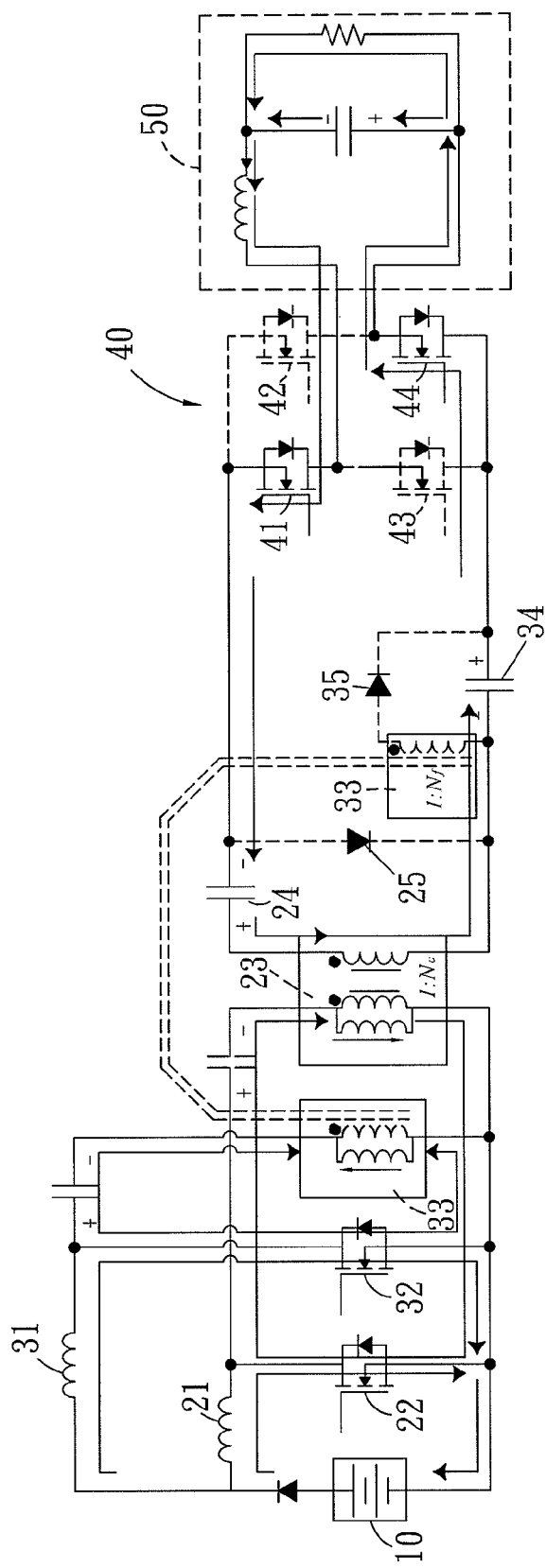
FIG. 6C is a schematic view showing Mode M3 of a conversion circuit according to one embodiment of the present invention.

Refer to FIG. 6C for Mode M3. In Mode M3, the first DC-side switch 22, the second DC-side switch 32, the first bridge-type switch 41 and the fourth bridge-type switch 44 are all in a conduction state. The second bridge-type switch 42 and the third bridge-type switch 43 are in a non-conduction state. The first and second diodes 25 and 35 remain reversely biased and in a non-conduction state. The DC input unit 10 also charges the first and second inductors 21 and 31. The first inductor 21, the second inductor 31, the first bridge-type switch 41 and the fourth bridge-type switch 44 are connected to form a loop, whereby the first and second capacitors 24 and 34 discharge in series, and whereby the step-up ratio is promoted to output a high AC voltage output.

Figure 6D:
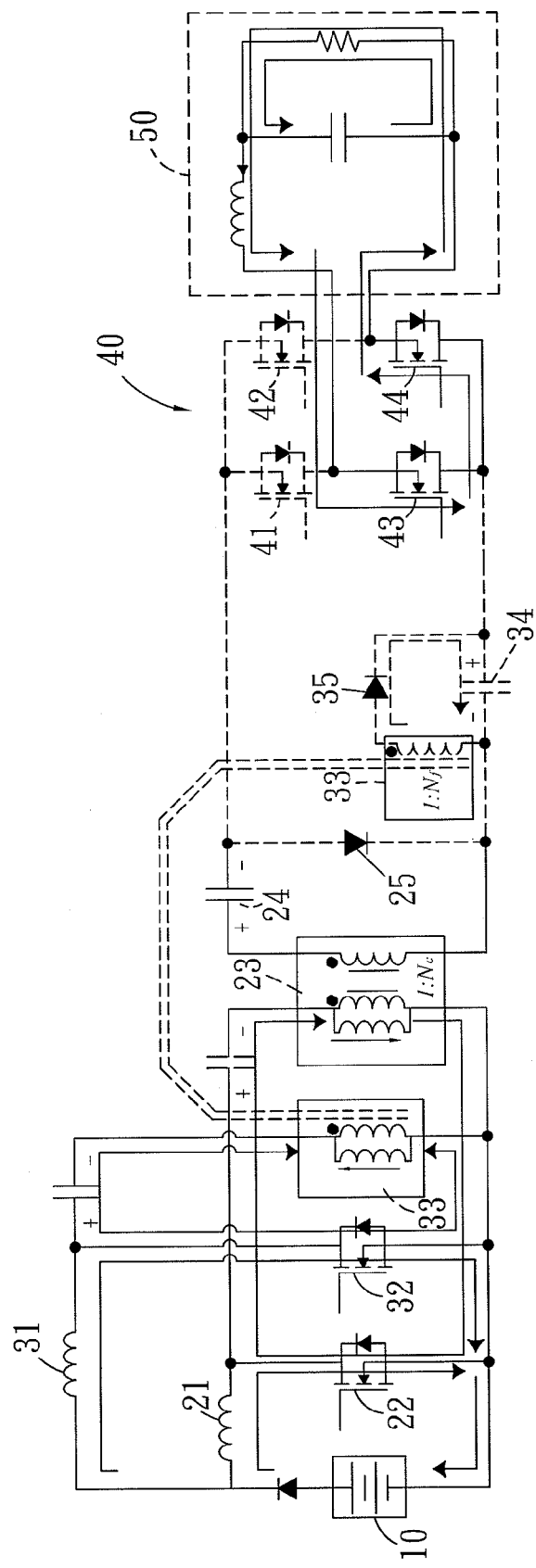
FIG. 6D is a schematic view showing Mode M4 of a conversion circuit according to one embodiment of the present invention.

Refer to FIG. 6D for Mode M4. Mode M4 is similar to Mode M2. Mode M4 is different from Mode M2 in that the first and second bridge-type switches 41 and 42 are in a non-conduction state and that the third and fourth bridge-type switches 43 and 44 are in a conduction state. The DC input unit 10 still charges the first and second inductors 21 and 31. The third bridge-type switch 43, the fourth bridge-type switch 44 and the filter unit 50 remain in the free-wheeling operation mode.

Figure 6E:
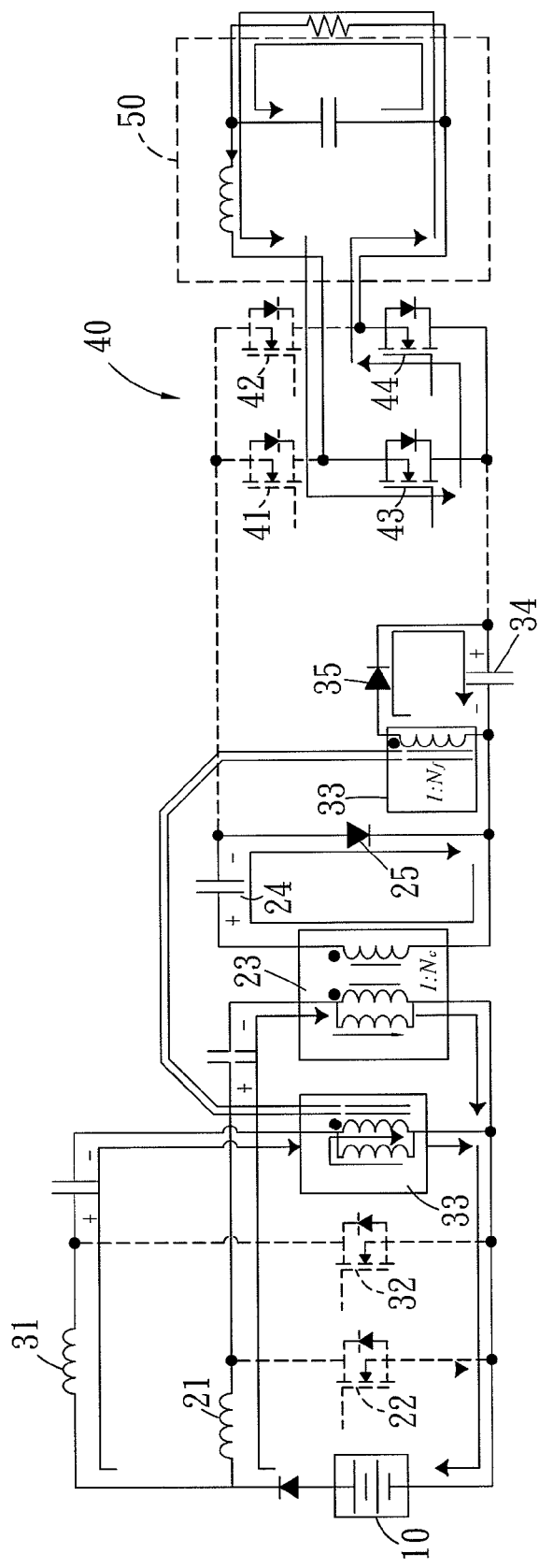
FIG. 6E is a schematic view showing Mode M5 of a conversion circuit according to one embodiment of the present invention.

Refer to FIG. 6E for Mode M5. Mode M5 is similar to Mode M1. Mode M5 is different from Mode M1 in that the first and second bridge-type switches 41 and 42 are in a non-conduction state and that the third and fourth bridge-type switches 43 and 44 are in a conduction state. The first and second high-frequency transformers 23 and 33 respectively convert the DC voltages originally stored in the first and second inductors 21 and 31 into the high DC voltage and respectively store the high DC voltages into the first and second capacitors 24 and 34. The third bridge-type switch 43, the fourth bridge-type switch 44 and the filter unit 50 remain in the free-wheeling operation mode.

Figure 7:
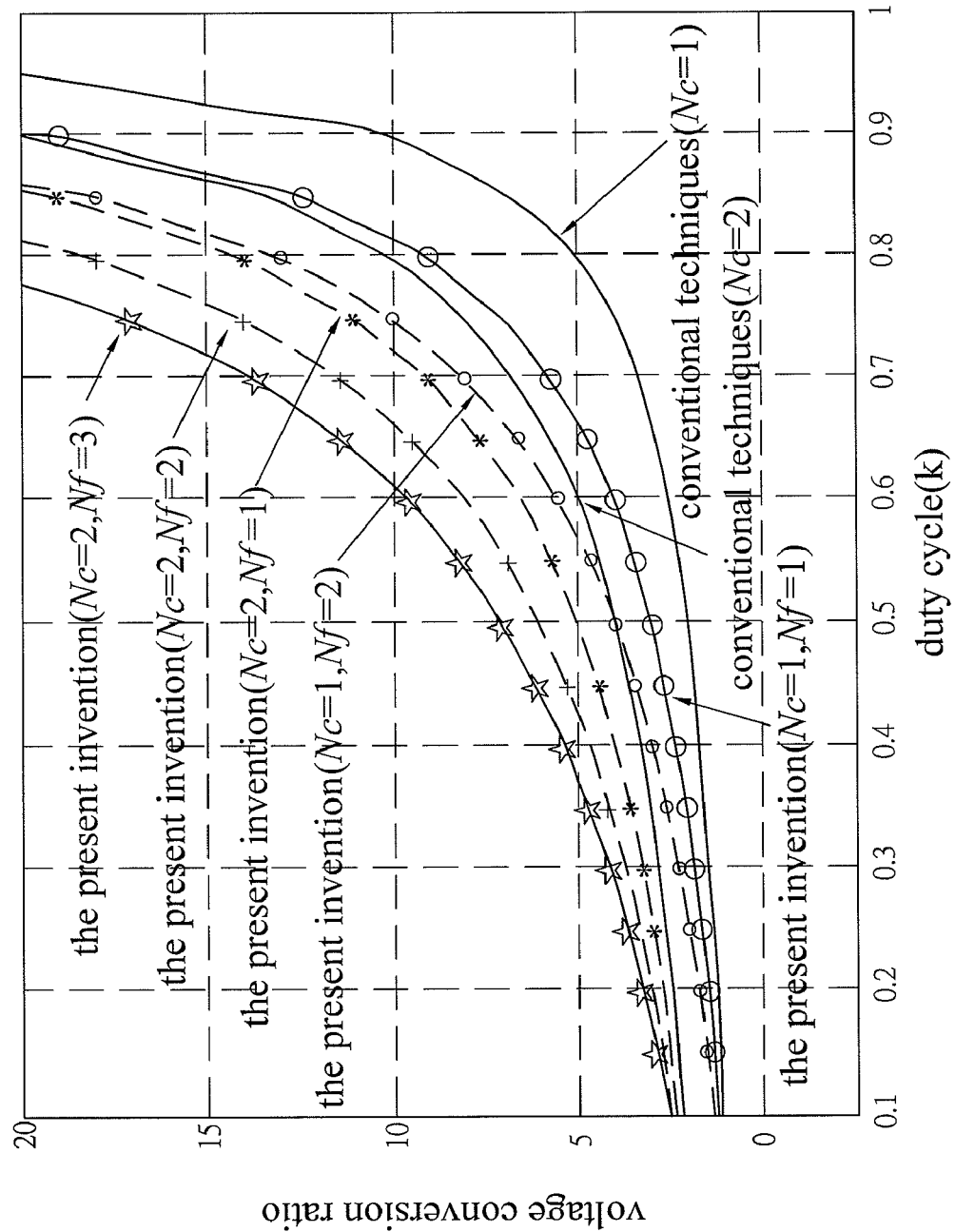
FIG. 7 is a diagram showing the comparison of voltage conversion ratio between the conventional techniques and the embodiments of the present invention.

Refer to FIG. 7 a diagram showing the comparison of voltage conversion ratios between the conventional techniques and the embodiments of the present invention, wherein the voltage conversion ratio of the present invention are compared with those of the conventional converters only containing a Cuk circuit. When the turns ratio Nc of the first high-frequency transformer 23 is 1, the voltage conversion ratios of the present invention is higher than that of the conventional techniques for the same duty cycle. The present invention can further promote the voltage conversion ratios via controlling the turns ratio Nf of the second high-frequency transformer 33.

Figure 8:
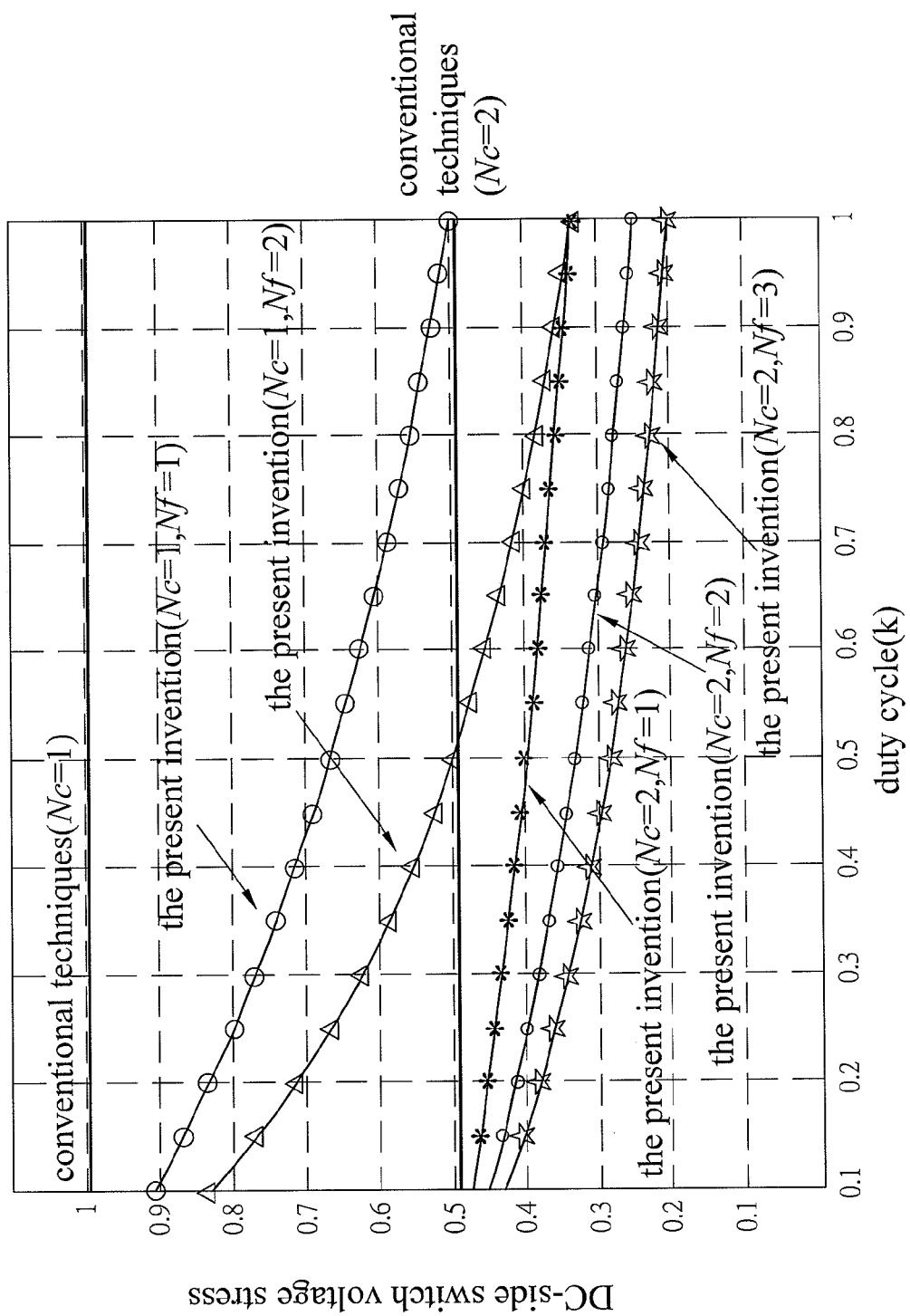
FIG. 8 is a diagram showing the comparison of the DC-side switch voltage stress between the conventional techniques and the embodiments of the present invention.

Refer to FIG. 8 a diagram showing the comparison of DC-side switch voltage stress. When the turns ratio Nc of the first high-frequency transformer 23 is 1, the DC-side switch voltage stress of the present invention is lower than that of the conventional technology for the same duty cycle. The present invention can further decrease the DC-side switch voltage stress via controlling the turns ratio Nf of the second high-frequency transformer 33.

Figure 9:
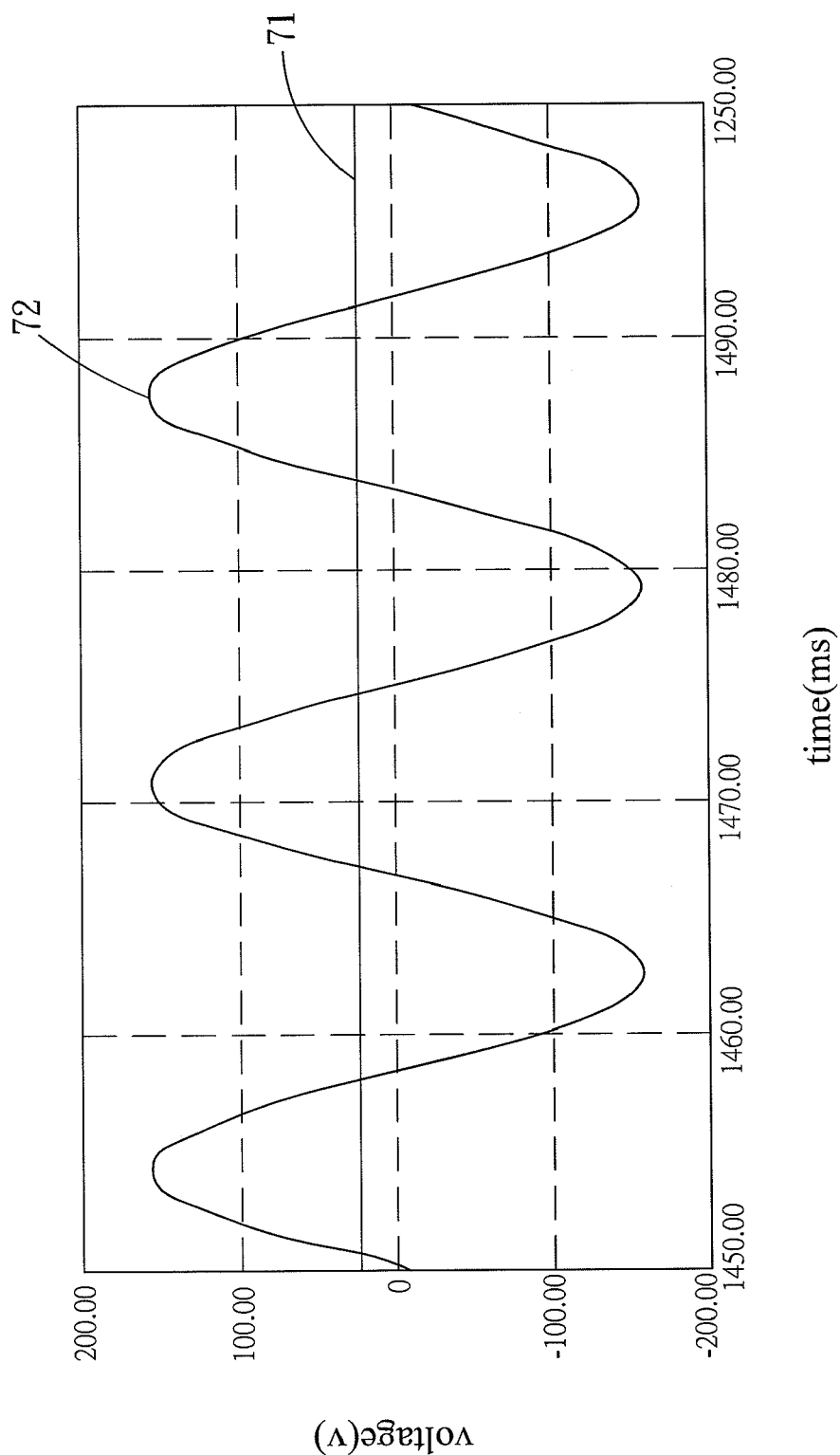
FIG. 9 is a diagram showing an input waveform and an output waveform of a conversion circuit in one embodiment of the present invention.

Refer to FIG. 9 a diagram showing an input waveform and an output waveform in one embodiment of the present invention. Suppose the parameters of the conversion circuit of the present invention has the following values: the input DC voltage 71 of the DC input unit 10 is 24 volts; the switching frequency is 20 kHz; each of the first and second inductors 21 and 31 has an inductance of 2 mH; each of the turns ratio Nc of the first high-frequency transformer 23 and the turns ratio Nf of the second high-frequency transformer 33 is 2; the capacitance of the first capacitor 24 is 1000 μF; the capacitance of the second capacitor 34 is 400 μF; each of the first DC-side switch 22 and the second DC-side switch 32 has a duty cycle of 0.7. Under the above-mentioned conditions, the AC output voltage has a peak value of 156 volts.

In conclusion, the present invention uses the isolated Cuk integration unit 20 and the auxiliary step-up unit 30 to form a multi-phase input and uses parallel charging and cascade discharging to boost the DC voltage in the DC side with a low voltage bridging the switches and a low duty cycle. The auxiliary step-up unit 30 not only shares the entirety of power but also exempts the DC-side circuit from using high voltage power switches, whereby the cost of elements is reduced. Therefore, the present invention can decrease the switching loss and conduction loss of the first and second DC-side switches 22 and 32 and promote the efficiency of the circuit. Further, the output AC unit 40 is adapted to various AC circuits. Therefore, the present invention has diversified applications.

The present invention possesses utility, novelty and non-obviousness and meets the condition for a patent. Thus, the Inventor files the application for a patent. It will be appreciated if the patent is approved fast.

The embodiments described above are only to exemplify the present invention but not to limit the scope of the present invention. Any equivalent modification or variation according to the spirit or technical contents disclosed in the specification and drawings is to be also included within the scope of the present invention.

What is claimed is:

1. An integrated-type high step-up ratio DC-AC conversion circuit with an auxiliary step-up circuit, comprising:
    a DC input unit providing a DC voltage;
    an isolated Cuk integration unit converting the DC voltage into a high DC voltage and further comprising a first high-frequency transformer connected with the DC input unit and a first capacitor connected with the first high-frequency transformer, and the first capacitor stores power coming from the first high-frequency transformer;
    an auxiliary step-up unit connected with the isolated Cuk integration unit in parallel and further comprising a second high-frequency transformer connected with the DC input unit and a second capacitor connected with the second high-frequency transformer and the first capacitor, and second capacitor stores power coming from the second high-frequency transformer; and
    an AC output unit converting the high DC voltage into an AC voltage, connected with the first capacitor and the second capacitor, and outputting the AC voltage.

2. The integrated-type high step-up ratio DC-AC conversion circuit with an auxiliary step-up circuit according to claim 1, wherein the isolated Cuk integration unit further comprises a first inductor arranged in front of the first high-frequency transformer and a first DC-side switch connected with the first high-frequency transformer in parallel, and the first inductor connects with the DC input unit and the first high-frequency transformer.

3. The integrated-type high step-up ratio DC-AC conversion circuit with an auxiliary step-up circuit according to claim 1, wherein the isolated Cuk integration unit further comprises a first diode connecting with the first capacitor and the first high-frequency transformer.

4. The integrated-type high step-up ratio DC-AC conversion circuit with an auxiliary step-up circuit according to claim 1, wherein the auxiliary step-up unit further comprises a second inductor arranged in front of the second high-frequency transformer and a second DC-side switch connected with the second high-frequency transformer in parallel, and the second inductor connects with the DC input unit and the second high-frequency transformer.

5. The integrated-type high step-up ratio DC-AC conversion circuit with an auxiliary step-up circuit according to claim 1, wherein the auxiliary step-up unit further comprises a second diode connecting with the second capacitor and the second high-frequency transformer.

6. The integrated-type high step-up ratio DC-AC conversion circuit with an auxiliary step-up circuit according to claim 1, wherein the AC output unit is a full-bridge switching circuit.

7. The integrated-type high step-up ratio DC-AC conversion circuit with an auxiliary step-up circuit according to claim 6, wherein the AC output unit is connected with a filter unit.

* * * * *